United States Patent
Okumura

(10) Patent No.: US 7,921,395 B2
(45) Date of Patent: Apr. 5, 2011

(54) METHOD FOR LAYING OUT DECOUPLING CELLS AND APPARATUS FOR LAYING OUT DECOUPLING CELLS

(75) Inventor: Takaaki Okumura, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 405 days.

(21) Appl. No.: 12/078,341

(22) Filed: Mar. 28, 2008

(65) Prior Publication Data

US 2008/0244488 A1    Oct. 2, 2008

(30) Foreign Application Priority Data

Mar. 30, 2007   (JP) ................................. 2007-090496

(51) Int. Cl.
    *G06F 17/50*    (2006.01)
(52) U.S. Cl. ........ 716/113; 716/101; 716/104; 716/119; 703/14
(58) Field of Classification Search .................. 716/101, 716/104, 113, 119
    See application file for complete search history.

(56) References Cited

U.S. PATENT DOCUMENTS

2005/0278672 A1 * 12/2005 Hosono et al. .................... 716/6

* cited by examiner

*Primary Examiner* — Thuan Do
(74) *Attorney, Agent, or Firm* — Fujitsu Patent Center

(57) ABSTRACT

A method for laying out decoupling cells in a semiconductor integrated circuit including a plurality of paths. The method includes extracting from a timing analysis result a timing slack amount as a timing margin for power supply noise in one of the paths serving as a target path, converting the extracted timing margin to a noise tolerance amount, comparing the noise tolerance amount and a power supply noise amount of the target path, and determining whether or not a decoupling cell must be additionally laid out in the target path based on the comparison result.

16 Claims, 7 Drawing Sheets

METHOD FOR LAYING OUT DECOUPLING CELLS AND APPARATUS FOR LAYING OUT DECOUPLING CELLS

CROSS-REFERENCE TO RELATED APPLICATIONS

This application is based upon and claims the benefit of priority from the prior Japanese Patent Application No. 2007-090496, filed on Mar. 30, 2007, the entire contents of which are incorporated herein by reference.

BACKGROUND

1. Field

The present disclosure relates to a method and apparatus for laying out decoupling cells (capacitors) in a semiconductor device.

2. Description of the Related Art

The enlargement of semiconductor devices has resulted in an increase in the number of simultaneously operated elements. Such simultaneous operation may cause fluctuation in the power supply voltage in a semiconductor device. Furthermore, operation errors may be caused by power supply noise or timing deviations. Therefore, to reduce power supply noise, decoupling cells (capacitors) are laid out between a low-voltage power supply wiring and a high-voltage power supply wiring of a semiconductor device. In a semiconductor device provided with such decoupling cells, the decoupling cells must be efficiently laid out to reduce the designing time.

When designing a semiconductor device, power supply noise (DvD) analysis is performed using an electronic design automation (EDA) tool to determine the dynamic fluctuation of the power supply voltage and lay out decoupling cells so as to reduce the amount of noise. The amount of noise is determined from the power supply noise analysis. However, the criterion is unclear for the determination of the amount of noise with respect to the positions for laying out the decoupling cells and the capacitance of the decoupling cells. Thus, the power supply noise analysis is repeated on corrected layout data after the decoupling cells have been laid out. That is, an optimized decoupling cell layout is determined through a trial and error method. Since this method requires a considerable time to determine the layout of decoupling cells, it is not suitable for highly integrated semiconductor devices. Furthermore, this method does not eliminate operation errors resulting from timing deviations caused by power supply noise.

In order to solve this problem, a signal path (hereinafter, simply referred to as path) that is believed to have been affected by a power supply fluctuation is extracted, and a simulation of operation for the semiconductor device is performed with a circuit simulator such as a simulation program with integrated circuit emphasis (Spice) simulator. The simulation result is used to determine whether or not timing requirements are satisfied. A decoupling cell is added near the path when the timing requirements are not satisfied. Then, the power supply noise analysis is performed again on the corrected layout data after the addition.

SUMMARY

According to one aspect of the embodiment, a method for laying out decoupling cells is provided, which is executed by a decoupling cell layout apparatus having stored in a storage device cell position information representing the position of a decoupling cell that is to be added to layout data for a semiconductor integrated circuit including a plurality of paths, the method comprising: extracting from a timing analysis result a timing slack amount as a timing margin for power supply noise in one of the plurality of paths serving as a target path with the decoupling cell layout apparatus; converting the extracted timing margin to a noise tolerance amount with the decoupling cell layout apparatus; comparing the noise tolerance amount and a power supply noise amount of the target path with the decoupling cell layout apparatus; and determining whether or not a decoupling cell must be additionally laid out in the target path based on the comparison result with the decoupling cell layout apparatus.

Other aspects and advantages of the present invention will become apparent from the following description, taken in conjunction with the accompanying drawings.

DETAILED DESCRIPTION OF EMBODIMENT

Figure 1:
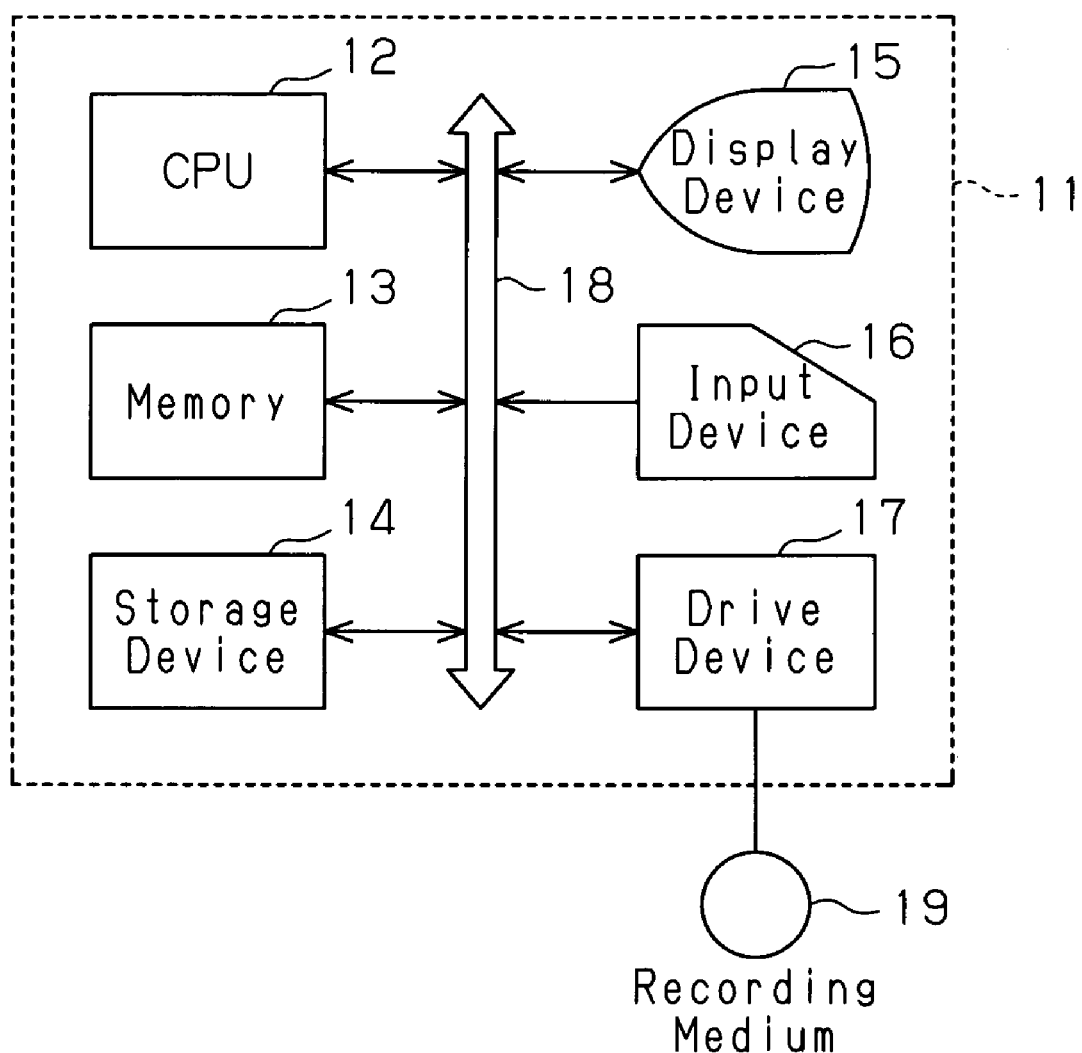
FIG. 1 is a schematic diagram of a decoupling cell layout device according to a representative embodiment.

FIG. 1 shows a decoupling cell layout apparatus 11. The decoupling cell layout apparatus 11 is a typical computer aided design (CAD) apparatus provided with a central processing unit (hereinafter referred to as the "CPU") 12, a memory 13, a storage device 14, a display device 15, an input device 16, and a drive device 17, which are connected to one another by a bus 18.

The CPU 12 executes programs with the memory 13 to perform the processing required to lay out decoupling cells. The memory 13 stores programs and data required for laying out decoupling cells. The memory 13 may be a cache memory, a system memory, a display memory, or the like (not shown).

The display device 15 displays a layout screen and a parameter input screen. The display device 15 may be a CRT, LCD, a PDP, or the like (not shown). The input device 16 includes a keyboard and mouse device (not shown) used to input user requests, instructions, and parameters.

The storage device 14 may be a magnetic disk device, an optical disc device, a magneto-optical disc device, or the like (not shown). The storage device 14 stores program data (hereinafter referred to as the "program") and various types of data files (hereinafter referred to as the "files") 31 to 33 to perform the decoupling cell layout process, shown in FIG. 2. The CPU 12 transfers programs and data stored in each type of file to the memory 13 when necessary and sequentially executes the programs in accordance with the instructions from the input device 16. Then, the CPU 12 reads the files and data required for the execution of the programs, and stores the files and data generated during the execution of the programs in the storage device 14. The storage device 14 may also be used as a database.

A recording medium 19 provides the programs executed by the CPU 12. The drive device 17 accesses the recorded contents of the recording medium 19. The CPU 12 reads programs from the recording medium 19 through the drive device 17 and installs the read program in the storage device 14. In addition to programs, the recording medium 19 may also provide various types of data such as libraries and the like.

Any computer-readable recording medium, such as a memory card, a floppy disk, an optical disc (CD-ROM, DVD-ROM, etc.), magneto-optical disc, MO, MD or the like) (not shown) may be used as the recording medium 19. A semiconductor memory and externally connected hard disk device or the like may also be used as the recording medium 19. The above-mentioned programs may be pre-stored in the recording medium 19 and loaded in the memory 13 when required.

The recording medium 19 may be a storage device of a server apparatus that is connected to the cell layout apparatus 11 (computer) through a communication medium, disk device, or a media on which programs are recorded to be uploaded or downloaded through a communication medium. In addition to a recording media storing recorded programs that are directly executable by a computer, the recording medium 19 may also be a recording media recording programs that become executable when installed to itself or other recording medium (hard disk or the like), as well as recording media on which recorded programs which are encoded or compressed.

Figure 2:
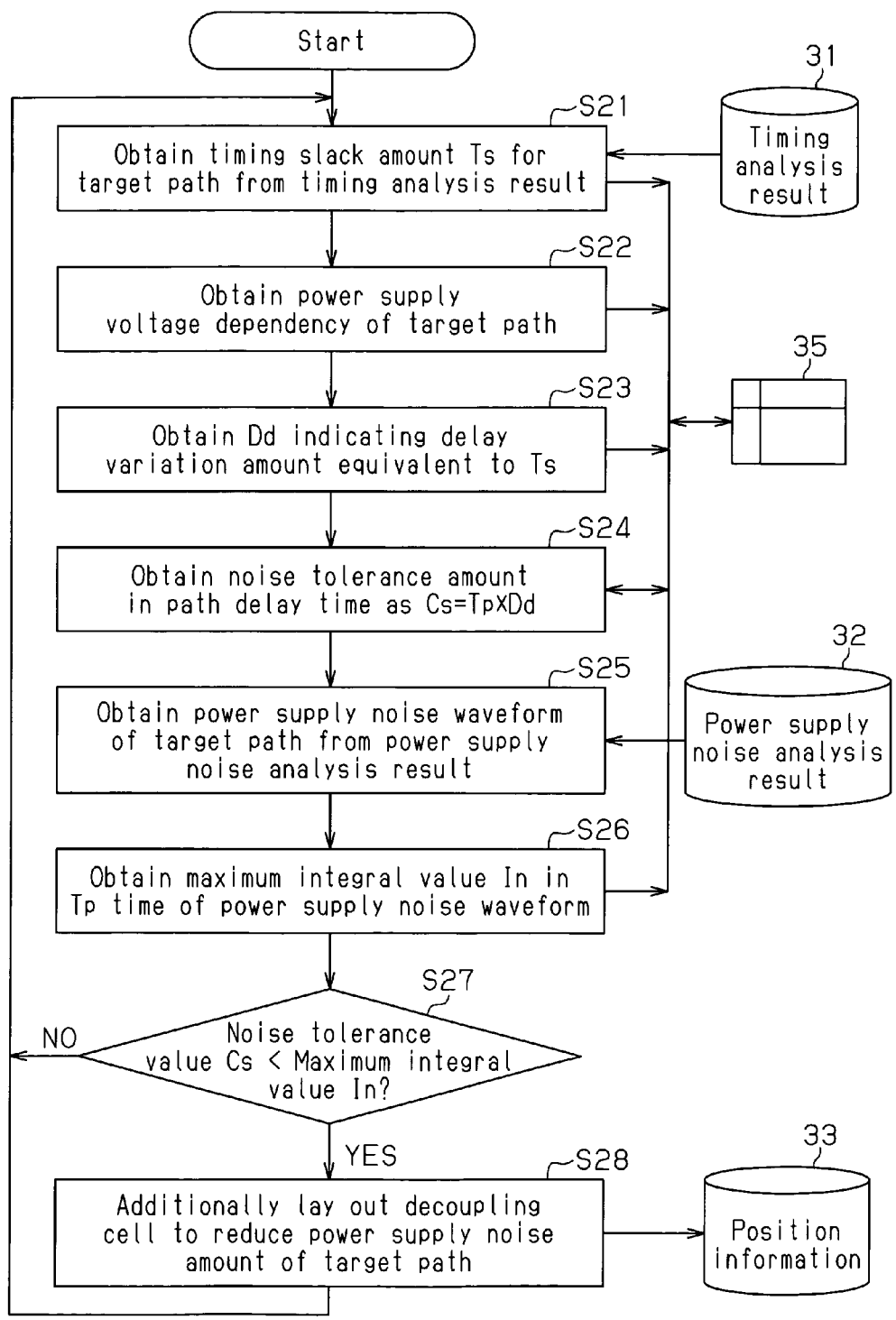
FIG. 2 is a flowchart of a decoupling cell layout process.

The decoupling cell layout process will now be discussed with reference to FIG. 2.

The cell layout apparatus 11 executes steps S21 to S28 to lay out decoupling cells in a semiconductor integrated circuit device (LSI). In the decoupling cell layout process, the cell layout apparatus 11 determines whether or not the addition of a decoupling cell is necessary based on a numerical value obtained from data (information) stored in the files 31 and 32. Then, the cell layout apparatus 11 stores in the file 33 position information that represents the position of a decoupling cell that is to be added. The files 31 to 33 are stored in the storage device 14, which is shown in FIG. 1. The cell layout apparatus 11 stores temporary values calculated through the process illustrated in FIG. 2 in a work area 35. The work area 35 is generated in the memory 13 or the storage device 14 shown in FIG. 1.

Steps S21 to S28 will now be described.

In step S21, the cell layout apparatus 11 obtains a timing slack amount Ts (timing margin) of a target path from a timing analysis result in the file 31. The timing analysis result is stored in the file 31, which is generated by, for example, a static timing analysis (STA) tool. The STA tool integrates the signal delay time of circuit elements and wiring to calculate a propagation delay time for each path. The cell layout apparatus 11 monitors the target path, which is included in the semiconductor integrated circuit, and extracts, from the timing analysis result, the timing slack amount Ts in the target path as a timing margin with respect to power supply noise. The cell layout apparatus 11 then converts the extracted timing margin to a power supply tolerance value. The conversion uses a fixed value, a predetermined coefficient, and a value calculated from the delay in the target path.

An example will now be described using the circuit shown in FIG. 3(*a*). In this circuit, a clock signal CK is provided to two flip-flop circuits (hereinafter referred to as FF circuits) 41 and 42 via buffer circuit 43 and 44, respectively. The output signal of the first FF circuit 41 is provided to the second FF circuit 42 via a plurality of logic circuits (e.g., buffer circuits 45). This circuit includes a clock path, through which the clock signal CK is provided to the second FF circuit 42 via the buffer circuit 44, and a data path, through which the output signal of the first FF circuit 41 is provided to the second FF circuit 42. The FF circuits 41 and 42 hold an input signal when the clock signal rises to output a signal having the same level as the input signal.

Figure 3A:
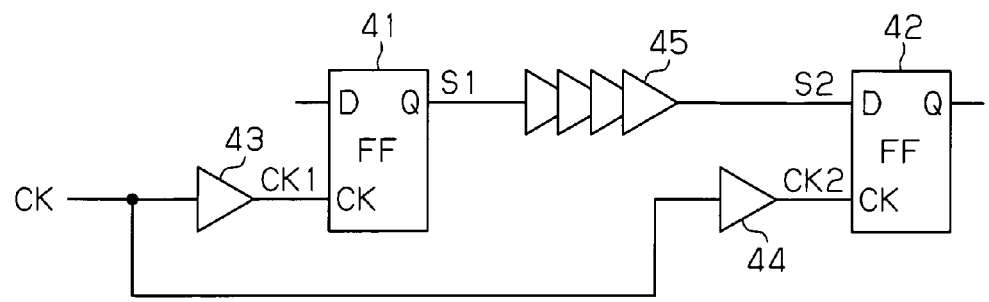
FIGS. 3(a) and 3(b) are diagrams illustrating the acquisition of a timing slack amount.
Figure 3B:
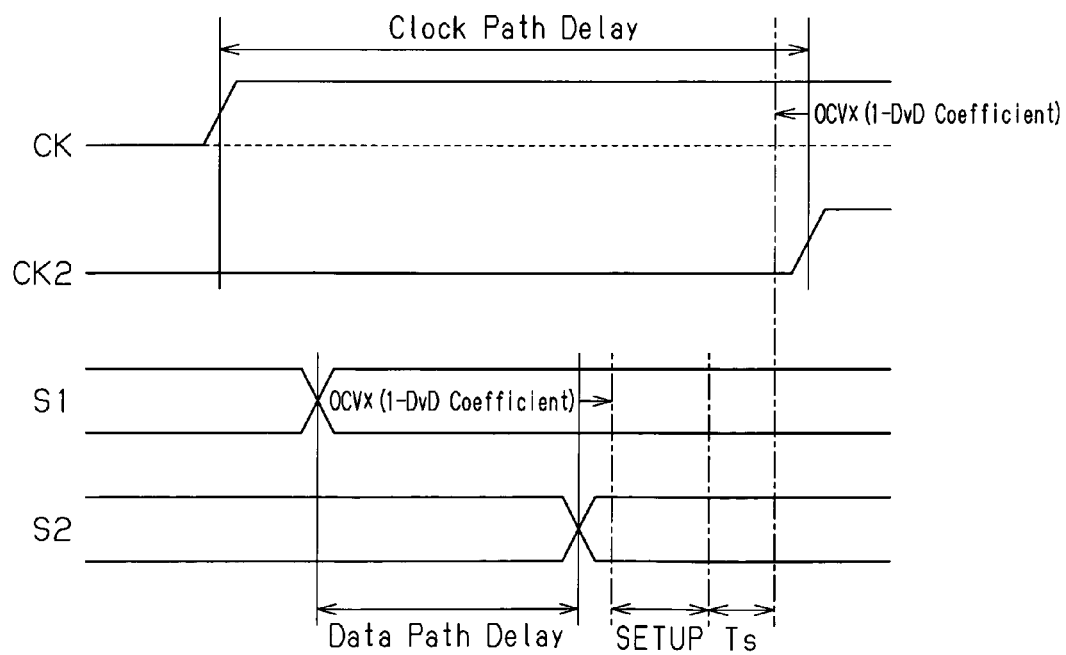

As shown in FIG. 3(*b*), a clock signal CK1 of the first FF circuit 41 and a clock signal CK2 of the second FF circuit 42 are affected by a delay which originates in the wiring path (clock path) that transfers the clock signal CK. The clock path delay is the delay time from the rise of the clock signal CK1 to the rise of the clock signal CK2. A data signal S1, which is output from the first FF circuit 41, and a data signal S2, which is output from the second FF circuit 42, are affected by a delay (including the delay caused by the buffer circuit 45) originated in the path (data path) between the first FF circuit 41 and the second FF circuit 42. The data path delay is the delay time from the time of a shift in the data signal S1 to the time of a shift in the data signal S2. For example, the setup (SETUP) time required in the second FF circuit 42 is stored in the cell library (for example, in the file 53 shown in FIG. 7), and the difference between the setup time and the time from when data is changed to when the clock signal CK2 rises is the timing margin (timing slack amount).

The path delay time is affected by power supply voltage fluctuations. The type of power supply voltage fluctuation that would cause a problem when an operation is synchronized with the clock signal is a power supply voltage drop. In the buffer circuit, for example, a drop in the power supply voltage would increase the time required for the output signal to shift and lengthen the delay time. In the circuit shown in FIG. 3(*a*), for example, to obtain efficient timings (i.e., reduce timing margin), the timing of the input signal to the second FF circuit 42 may be delayed. Alternatively, the rising timing of the clock signal CK2 in the second FF circuit 42 may be advanced.

When taking into consideration a power supply voltage drop in the designing stage, the present embodiment adds a power supply voltage fluctuation tolerance value of the semiconductor integrated circuit to the delay time of a path to vary timings in the paths. For example, a timing may be varied by correcting an on-chip variance coefficient (OCV coefficient) used in the timing analysis by a calculation using a power supply voltage fluctuation coefficient (DvD coefficient) (e.g., OCV=(OCV×(1−DvD coefficient)). Thus, as described above, a power supply voltage fluctuation (particularly, a power supply voltage drop) increases the delay time. A path with an increasable delay time is set as a target path (or subject path). In the circuit shown in FIG. 3(*a*), the data path is set as the target path when considering the setup time, and the clock path is set as the target path when considering the hold time. The target path is subjected to timing analysis by increasing the delay time, and a timing slack amount Ts is obtained from the analysis result. Although the DvD coefficient is used to vary the delay time for a path, a tolerance value may be set as a fixed value.

Figure 4A:
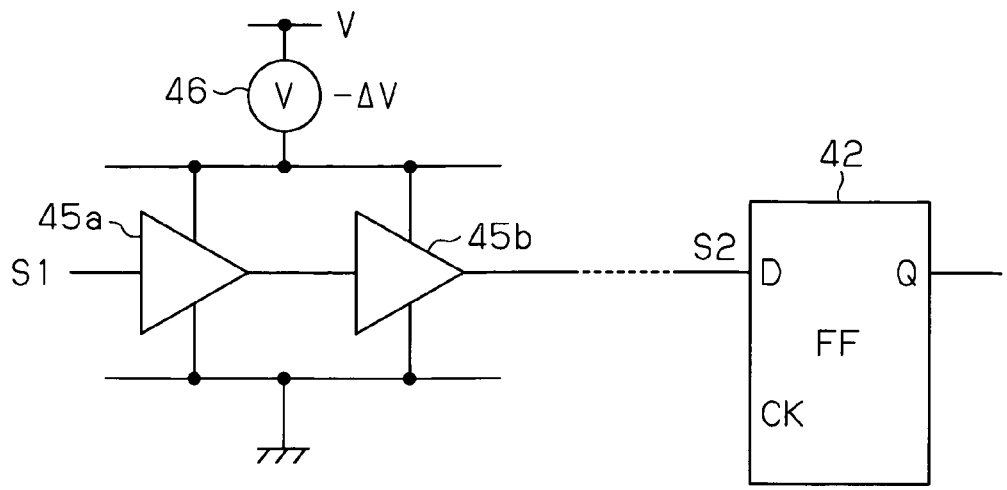
FIGS. 4(a) through 4(c) are diagrams illustrating the extraction of delay change characteristics relative to the voltage drop value.
Figure 4B:
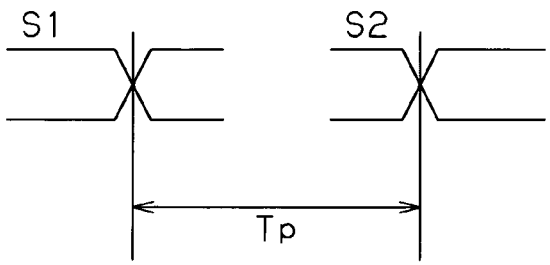
Figure 4C:
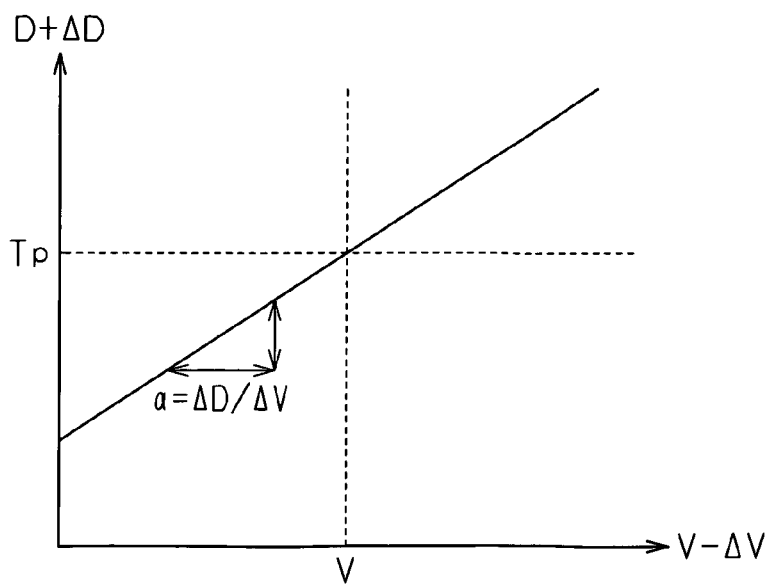

In step S22, the cell layout apparatus 11 obtains the delay time (reference delay time) Tp for the ideal voltage in the target path, and the dependency of the delay time on the DC power supply voltage in the target path. For example, referring to FIG. 4(*a*), a voltage source 46, which is connected to a high voltage power supply V, supplies drive voltage to the power terminals of cells 45*a* and 45*b*. The cell layout apparatus 11 obtains or calculates delay time variation characteristics with respect to a fixed amount of drop in the power supply voltage by varying the voltage of the voltage source 46. The delay time of the ideal voltage for each cell is stored in the cell library (for example, the file 53 of FIG. 7). The cell layout apparatus 11 performs a delay calculation or uses a spice simulator to calculate the time required from a shift in the target path, that is, a shift in the input signal S1 (shift in the output signal of the first FF circuit 41 shown in FIG. 3(*a*)) of the buffer circuit 45*a* to a shift in the input signal S2 of the second FF circuit 42. Then, the cell layout apparatus 11 uses the calculated time as the reference delay time Tp of the target path (refer to FIG. 4(*b*)). The cell layout apparatus 11 calculates the increase ($\Delta D$) in the delay time when the power supply voltage is varied ($-\Delta V$). Through these processes, the cell layout apparatus 11 determines the DC characteristics (voltage-delay value characteristics) of the delay time D with respect to the power supply voltage, as shown in FIG. 4(*c*). The cell layout apparatus 11 may also determine a parameter representing the characteristics of FIG. 4(*c*), for example, the inclination $\alpha$ ($\Delta D/\Delta V$) of the characteristics line. In FIG. 4(*c*), the horizontal axis V$-\Delta$V represents a drop in the power supply voltage and the vertical axis D+$\Delta$D represents an increase in the delay time.

Figure 5:
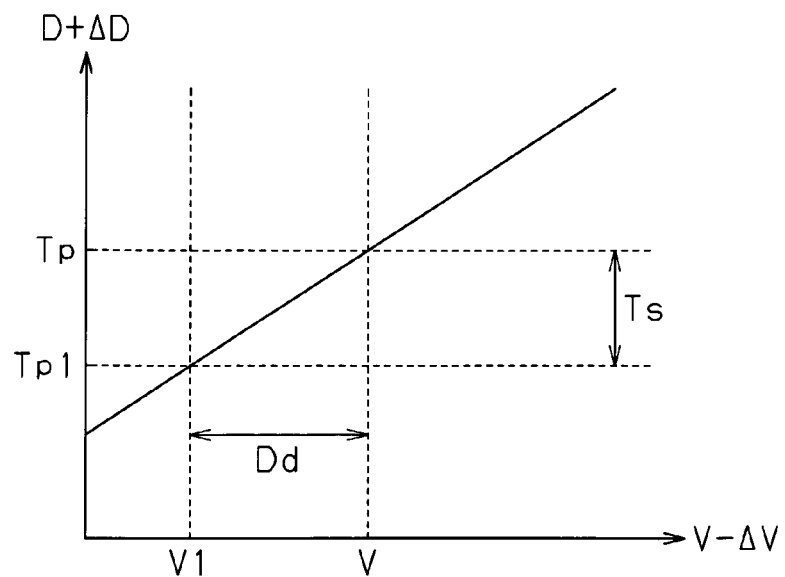
FIG. 5 is a chart illustrating converting the voltage drop value from the timing slack.

Next, in step S23, the cell layout apparatus 11 obtains an equivalent voltage drop amount Dd that obtains a delay variation amount equivalent to the obtained timing slack amount Ts. In the example shown in FIG. 5, the cell layout apparatus 11 calculates the voltage value V1 at point Tp1, which is shifted by the timing slack amount Ts from the reference delay time Tp, and sets the difference between the voltage value V1 and a reference voltage (high voltage power supply V) as an equivalent voltage drop amount Dd. The cell layout apparatus 11 may also calculate the equivalent voltage drop amount Dd using the inclination $\alpha$ (Ts/$\alpha$) of the characteristics line shown in FIG. 4(*c*). Approximation may be performed to calculate equivalent voltage drop amount Dd using a known linear equation in accordance with the cell characteristics.

Figure 6:
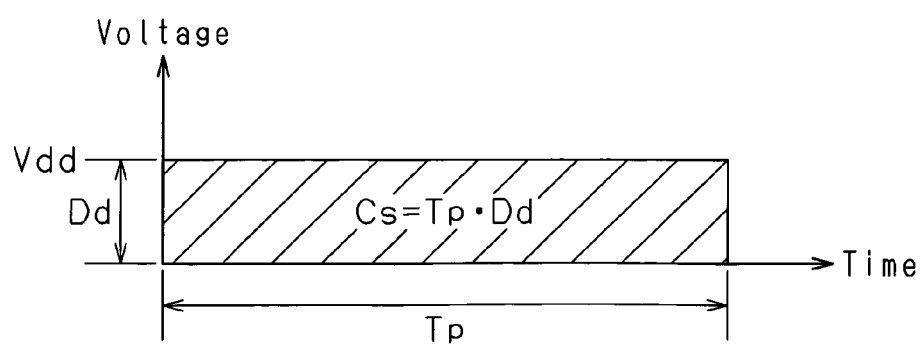
FIG. 6 is a diagram illustrating a noise tolerance amount calculation.

In step S24, the cell layout apparatus 11 calculates a noise tolerance amount Cs within the reference delay time Tp. As shown in FIG. 6, the noise tolerance amount Cs is calculated by multiplying the reference delay time Tp and the equivalent voltage drop amount Dd (Cs=Tp·Dd).

Figure 7:
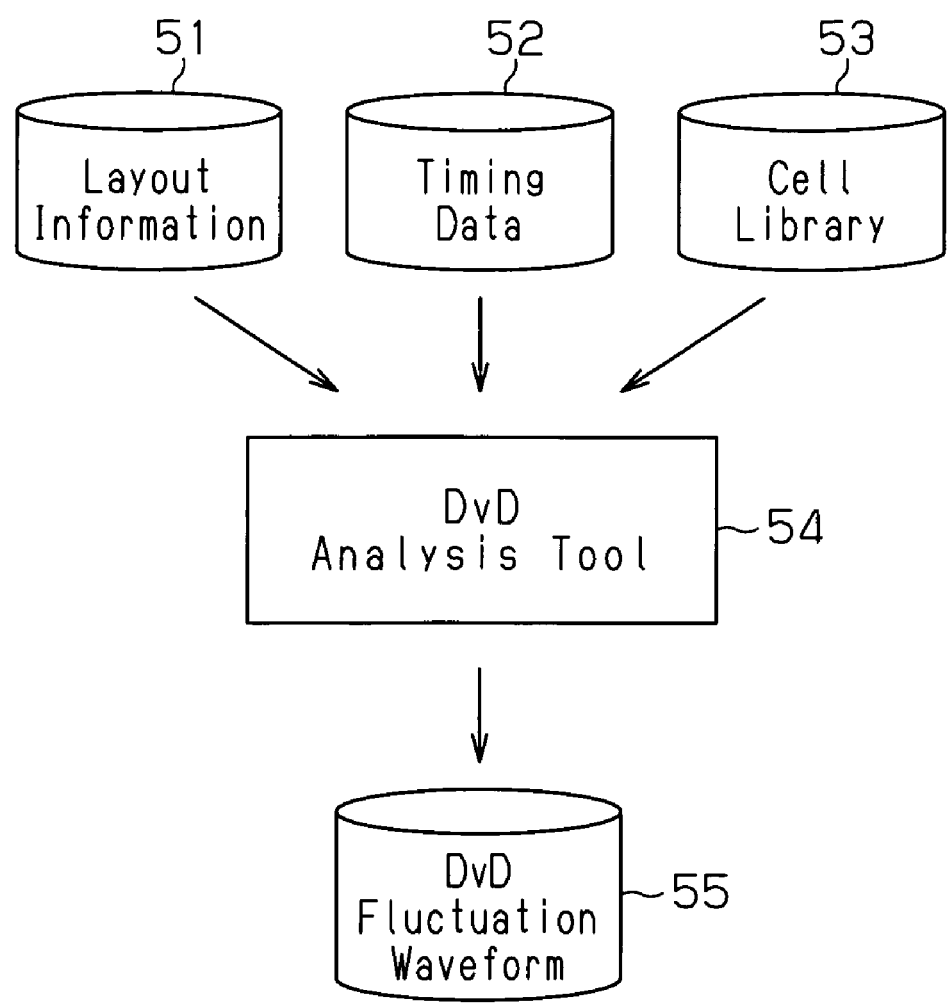
FIG. 7 is a flowchart showing the calculation of a noise waveform.

In step S25, the cell layout apparatus 11 obtains the power supply noise waveform at the power terminal of an instance (logic element (logic gate) or circuit block used in a circuit diagram, such as a cell or a macro cell) forming the target path from the power supply noise analysis result. Referring to FIG. 7, a known DvD analysis tool 54 executes an analysis to obtain a power supply voltage fluctuation waveform as an analysis result based on layout information (layout data of the semiconductor integrated circuit), timing data, and cell library respectively contained in files 51 through 53. Then, the DvD analysis tool 54 stores the waveform as a power supply noise waveform in a file 55. The cell layout apparatus 11 reads the power supply noise waveform from the file 55. The power supply noise analysis may be performed by the cell layout apparatus 11 or by another computer.

Figure 8A:
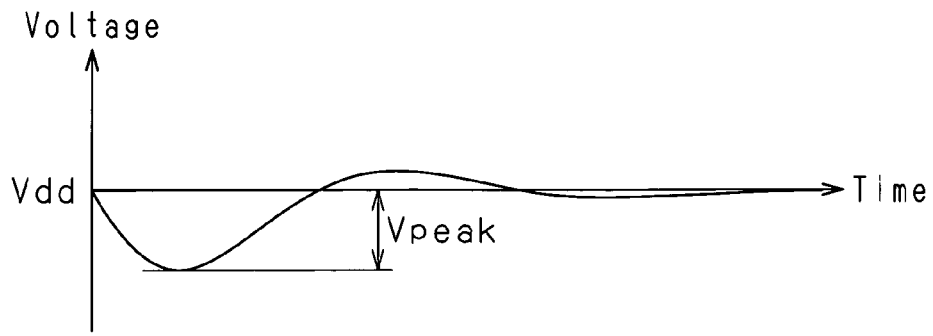
FIGS. 8(a) and 8(b) are charts illustrating the noise waveform integral value calculation.
Figure 8B:
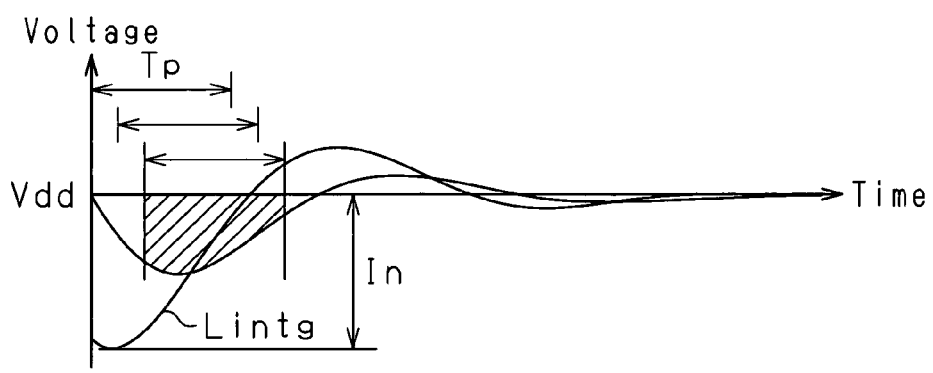

In step S26, the cell layout apparatus 11 obtains the noise integral value in the reference delay time Tp. FIG. 8(*a*) shows one instance of a power supply noise waveform. The cell layout apparatus 11 sets as a target a maximum fluctuation amount Vpeak of the power supply noise waveform for each instance in the target path. Referring to FIG. 8(*b*), as time elapses, the cell layout apparatus 11 obtains an integral value whenever shifting the reference delay time Tp. The integral value varies as shown by line Lintg in FIG. 8(*b*). Then, the cell layout apparatus 11 determines the maximum integral value In.

In step S27, the cell layout apparatus 11 compares the noise tolerance amount Cs determined in step S24 with the maximum integral value In determined in step S26. When the maximum integral value In is greater than the noise tolerance amount Cs (YES), the cell layout apparatus 11 proceeds to step S28 and adds an additional decoupling cell in the target path. On the other hand, when the maximum integral value In is less than the noise tolerance amount Cs (NO), there is no need to lay out a decoupling cell in the current target path. Thus, the cell layout apparatus 11 proceeds to step S21 to check the next target path.

Figure 9:
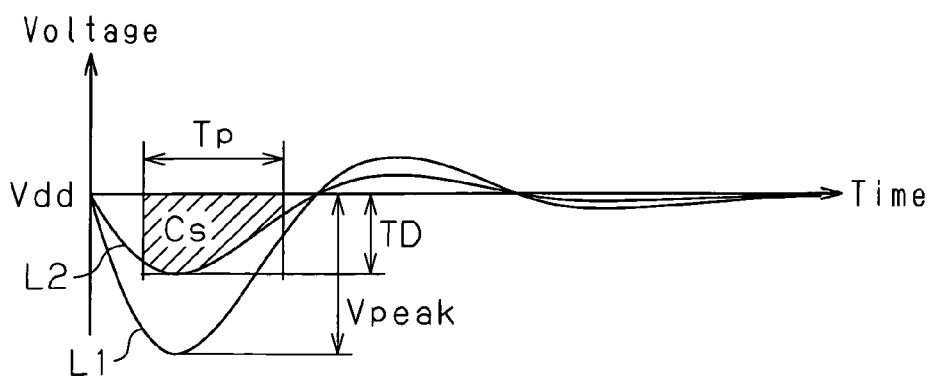
FIG. 9 is a chart illustrating the determination of the addition of a decoupling cell.

In step S28, the cell layout apparatus 11 adds a decoupling cell to reduce the amount of power supply noise in the target path. The decoupling cell is added at a location at which a peak drop is generated in the path. As shown in FIG. 9, the cell layout apparatus 11 performs scales (reduces in the voltage direction) the power supply noise waveform L1 so that the maximum integral value In becomes less than or equal to the noise tolerance amount Cs. Then, the cell layout apparatus 11 sets the peak value of the reduced waveform L2 as a target drop amount Td. The cell layout apparatus 11 then determines capacitance of the laid out decoupling cell based on the maximum fluctuation amount Vpeak of the power supply noise waveform and the target drop Td. The cell layout apparatus 11 then stores the capacitance and laid out position of the added decoupling cell to the file 33 shown in FIG. 2. Afterwards, the cell layout apparatus 11 proceeds to step S21 to analyze the next target path. The cell layout apparatus 11 ends the processing illustrated in FIG. 2 when there are no further target paths to be analyzed in steps S27 and S28, that is, when it is determined for all target paths whether or not decoupling cells must be added.

Steps S21, S22, S23, S24, S25, S26, S27, and S28 may respectively be referred to as a slack amount obtaining process, a dependency obtaining process, a drop value obtaining process, a tolerance value obtaining process, a noise waveform obtaining process, a maximum integral value obtaining process, a comparison process, and a layout process. The circuits executing steps S21, S22, S23, S24, S25, S26, S27, and S28 may respectively be referred to as a slack amount obtaining circuit, a dependency obtaining circuit, a drop value obtaining circuit, a tolerance value obtaining circuit, a noise waveform obtaining circuit, a maximum integral value obtaining circuit, a comparison circuit, and a layout circuit.

The representative embodiment has the advantages described below.

(1) The cell layout apparatus 11 extracts a timing slack amount of a target path from the timing analysis result as the timing margin for power supply noise in the target path, converts the timing margin to a noise tolerance amount, compares the noise tolerance amount and the amount of power supply noise in the target path, and determines whether or not a decoupling cell is needed in the target path based on the comparison result. As a result, the influence of the decoupling cell on the timing does not need to be analyzed again, and decoupling cells can be added in a shorter time since repeated processing is reduced.

(2) The cell layout apparatus 11 obtains the timing slack amount in the target path from the timing analysis result in step S21. Then, the cell layout apparatus 11 obtains the reference delay time of the ideal voltage for the target path to obtain the power supply voltage dependency of the delay in the target path in step S22. In step S23, based on the power supply voltage dependency, the equivalent voltage drop for obtaining a delay variation amount equivalent to the timing slack amount Ts is determined. In step S24, the noise tolerance amount is determined for the reference delay time based on the equivalent voltage drop value. In step S25, the power supply noise waveform in the target path is determined from the power supply noise analysis result. In step S26, noise integration values in the reference delay time are sequentially calculated for the power supply noise waveform to obtain the maximum integral value from the plurality of calculated integral values. In step S27, the maximum integral value is compared to the noise tolerance value. In step S28, a decoupling cell is additionally laid out to reduce the amount of power supply noise in the target path based on the comparison result. As a result, decoupling cells can be added in a shorter time while reducing repeated processing. Furthermore, decoupling cells can be laid out more easily than when using a spice simulator since the noise tolerance value is determined based on the determined power supply voltage dependency and the corresponding equivalent voltage drop amount.

(3) In step S21, the cell layout apparatus 11 sets the tolerance value for the power supply voltage fluctuation with respect to the path delay value of the target path to obtain the timing slack amount for the set path delay value. This easily obtains a timing margin corresponding to the delay value in the target path.

(4) In step S26, the cell layout apparatus 11 selects the one of the power supply noise waveforms of a plurality of instances forming a target path that includes the maximum fluctuation amount and sequentially calculates the integral values of the power supply noise waveforms. In this structure, the decoupling cells can be laid out at locations having significant effects on the target path.

(5) In step S28, the cell layout apparatus 11 scales the power supply noise waveform in accordance with the noise tolerance. Then, the cell layout apparatus 11 sets the scaled peak value as the target drop amount, and sets the tolerance value of the laid out decoupling cell based on the target drop amount. In this structure, the capacity of the decoupling cell is easily set in accordance with the power supply noise amount.

It should be apparent to those skilled in the art that the present invention may be embodied in many other specific forms without departing from the spirit or scope of the invention.

Although the cell layout apparatus 11 is formed by a single computer that executes program code, the cell layout apparatus may also be formed by combining circuits the operation of each of the steps.

The present examples and embodiments are to be considered as illustrative and not restrictive, and the invention is not to be limited to the details given herein, but may be modified within the scope and equivalence of the appended claims.

What is claimed is:

1. A method for laying out decoupling cells, wherein the method is executed by a decoupling cell layout apparatus having stored in a storage device cell position information representing the position of a decoupling cell that is to be added to layout data for a semiconductor integrated circuit including a plurality of paths, the method comprising:

extracting, by the decoupling cell layout apparatus, from a timing analysis result a timing slack amount as a timing margin for power supply noise in one of the plurality of paths serving as a target path;

converting, by the decoupling cell layout apparatus, the extracted timing margin to a noise tolerance amount;

comparing, by the decoupling cell layout apparatus, the noise tolerance amount and a power supply noise amount of the target path; and determining, by the decoupling cell layout apparatus, whether a decoupling cell must be additionally laid out in the target path based on the comparison result.

2. The method according to claim 1, wherein the decoupling cell layout apparatus executes:

obtaining the timing slack amount in the target path from the timing analysis result that is stored in the memory device;

obtaining a reference delay time corresponding to an ideal voltage for the target path and obtaining a power supply voltage dependency of a delay amount in the target path;

obtaining an equivalent voltage drop amount that causes a delay variation amount equivalent to the timing slack amount based on the power supply voltage dependency;

obtaining a noise tolerance amount for the reference delay time based on the equivalent voltage drop value;

obtaining a power supply noise waveform of the target path from the power supply noise analysis result;

calculating integral values of noise within the reference delay time based on the power supply noise waveform and obtaining a maximum integral value from the plurality of calculated integral values;

comparing the noise tolerance amount with the maximum integral value; and laying out a decoupling cell to reduce the amount of power supply noise in the target path based on the comparison result.

3. The method according to claim 2, wherein the decoupling cell layout apparatus in the obtaining the timing slack amount sets a tolerance value of a power supply voltage fluctuation for a path delay value of the target path and obtains a timing slack amount for the set path delay value.

4. The method according to claim 2, wherein the decoupling cell layout apparatus in the calculating integral values selects a power supply noise waveform having a maximum fluctuation amount from power supply noise waveforms of a plurality of instances forming the target path and calculates the integral values of the power supply noise waveforms.

5. The method according to claim 2, wherein the decoupling cell layout apparatus in the calculating integral values shifts the range of the reference delay time as time elapses to sequentially calculate the integral values.

6. The method according to claim 2, wherein the decoupling cell layout apparatus scales the power supply noise waveform in accordance with the noise tolerance amount, sets a peak value subsequent to the scaling as a target drop amount, and sets a capacitance of a decoupling cell that is laid out based on the target drop amount.

7. The method according to claim 2, wherein the decoupling cell layout apparatus in the laying out determines a layout position of a decoupling cell so as to lay out the decoupling cell near an instance corresponding to the power supply noise waveform and stores the capacitance and layout position of the decoupling cell.

8. The method according to claim 1, wherein the timing slack amount as the timing margin is a difference between a setup time of the target path and the time from when data is changed to when a clock signal to hold the data is changed.

9. A decoupling cell layout apparatus comprising:

a storage device which stores cell position information representing the position of a decoupling cell that is to be added to layout data for a semiconductor integrated circuit including a plurality of paths;

a memory storing program code; and a CPU in communication with the storage device and the memory, the CPU being operable for executing the program code, which when executed causes the CPU to perform tasks including:
- extracting from a timing analysis result a timing slack amount as a timing margin for power supply noise in a target path;
- converting the extracted timing margin to a noise tolerance amount;
- comparing the noise tolerance amount and a power supply noise amount of the target path; and
- determining whether a decoupling cell must be laid out in the target path based on the comparison result to reduce the power supply noise amount of the target path.

10. The decoupling cell layout apparatus according to claim 9, further comprising:
- a slack amount obtaining circuit for obtaining the timing slack amount in the target path from the timing analysis result that is stored in the memory device;
- a dependency obtaining circuit for obtaining a reference delay time corresponding to an ideal voltage for the target path and obtaining a power supply voltage dependency of a delay amount in the target path;
- a drop amount obtaining circuit for obtaining an equivalent voltage drop amount that causes a delay variation amount equivalent to the timing slack amount based on the power supply voltage dependency;
- a tolerance value obtaining circuit for obtaining a noise tolerance amount for the reference delay time based on the equivalent voltage drop value;
- a noise waveform obtaining circuit for obtaining a power supply noise waveform of the target path from the power supply noise analysis result;
- a maximum integral value obtaining circuit for calculating integral values of noise within the reference delay time based on the power supply noise waveform and obtaining a maximum integral value from the plurality of calculated integral values;
- a comparison circuit for comparing the noise tolerance amount with the maximum integral value; and
- a layout circuit for laying out a decoupling cell to reduce the amount of power supply noise in the target path based on the comparison result.

11. The decoupling cell layout apparatus according to claim 10, wherein the slack amount obtaining circuit sets a tolerance value of a power supply voltage fluctuation for a path delay value of the target path and obtains a timing slack amount for the set path delay value.

12. The decoupling cell layout apparatus according to claim 10, wherein the maximum integral value obtaining circuit selects a power supply noise waveform having a maximum fluctuation amount from power supply noise waveforms of a plurality of instances forming the target path and calculates the integral values of the power supply noise waveforms.

13. The decoupling cell layout apparatus according to claim 10, wherein the maximum integral value obtaining circuit sequentially shifts the range of the reference delay time as time elapses to calculate the integral values.

14. The decoupling cell layout apparatus according to claim 10, wherein the layout circuit scales the power supply noise waveform in accordance with the noise tolerance amount, sets a peak value subsequent to the scaling as a target drop amount, and sets a capacitance of a decoupling cell that is laid out based on the target drop amount.

15. The decoupling cell layout apparatus according to claim 10, wherein the layout circuit determines a layout position of a decoupling cell so as to lay out the decoupling cell near an instance corresponding to the power supply noise waveform and stores the capacitance and layout position of the decoupling cell.

16. The decoupling cell layout apparatus according to claim 9, wherein the timing slack amount as the timing margin is a difference between a setup time of the target path and the time from when data is changed to when a clock signal to hold the data is changed.

* * * * *